United States Patent [19]

Tuomaala

[11] Patent Number: 4,524,664

[45] Date of Patent: Jun. 25, 1985

[54] ELASTIC MOUNTING FOR THE ROD-SHAPED TOOTH OF A CUT-OFF SAW

[75] Inventor: Jorma A. K. Tuomaala, Oulu, Finland

[73] Assignee: Teratuote Oy, Toijala, Finland

[21] Appl. No.: 508,089

[22] Filed: Jun. 27, 1983

[30] Foreign Application Priority Data

Mar. 17, 1983 [FI]  Finland ................................ 830883

[51] Int. Cl.³ ...................... B27B 33/12; B23D 61/04
[52] U.S. Cl. ........................................ 83/840; 83/844; 83/845
[58] Field of Search ................. 83/835, 839, 840, 844, 83/845

[56] References Cited

U.S. PATENT DOCUMENTS

| | | | |
|---|---|---|---|
| 174,216 | 2/1876 | Emerson | 83/845 |
| 816,592 | 4/1906 | McLean et al. | 83/844 |
| 1,120,969 | 12/1914 | Petzold | 83/845 |
| 1,434,629 | 11/1922 | Petzold | 83/845 |

Primary Examiner—Donald R. Schran
Attorney, Agent, or Firm—Patrick F. Henry

[57] ABSTRACT

Elastic mounting for the rod-shaped inserted tooth (1) of a circular saw on a blade body (2). A problem is to eliminate loosening and disengagement of teeth caused by an impact-like loading on teeth and occurring after a relatively short service life. A blade body (2) or a tooth (1) is provided with an elastic strip (5 or 6) whose spring force (H), together with the flattening force exerted by a locking rivet (4'), urges a tooth against those points (a and b) in its fitting notch which also receive the bearing forces exerted by a shearing force of sawing.

6 Claims, 7 Drawing Figures

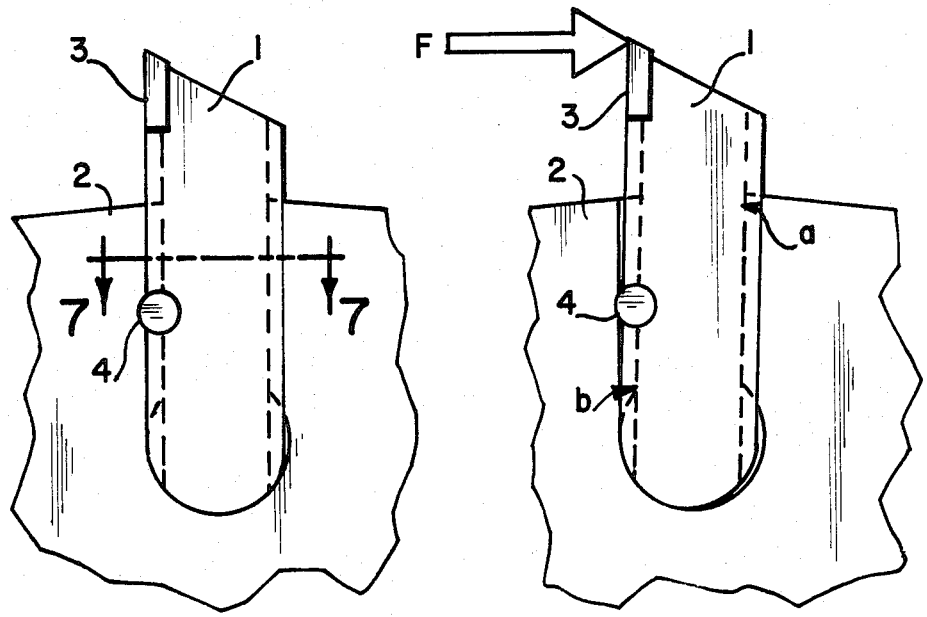
FIG. 2 PRIOR ART      FIG. 3 PRIOR ART
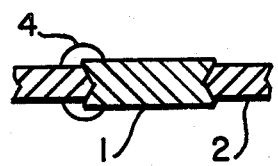
FIG. 7 PRIOR ART
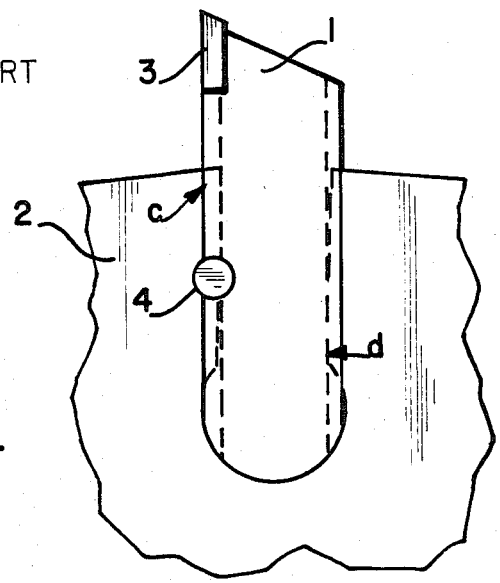
PRIOR ART  FIG. 4

ELASTIC MOUNTING FOR THE ROD-SHAPED TOOTH OF A CUT-OFF SAW

Circular blades are generally manufactured by notching the outer rim of a blade body. The notching produces teeth whose points or peaks are alternately bent aside and sharpened. Bending can be replaced by flattening the breast surface of a point by means of clenching. A third alternative is a tooth that is wider than the blade thickness and fixed to the point as well as made of a hard material. On becoming blunt, said teeth can be re-sharpened and for this the blade must be dismounted from a saw machine and mounted on a sharpening machine. In sharpening, the teeth gradually wear out. In that case a blade must usually be discarded and replaced with a new one.

The blades of log cut-off saws are bulky in size, with φ60 in.-100 in. and their weight is up to 400-700 lbs. Their dismounting and transport to sharpening is often very inconvenient because of difficult access to it. A blade body is also very expensive to be discarded as a result of tooth wear.

Efforts have been made to provide cut-off blades with inserted teeth that could be readily replaced by fresh ones without having to dismount the heavy basic blade from its position. This solution is set forth in FIG. 1. The outer rim of a blade body has been notched with substantially radial, round-bottomed recesses or notches having parallel sides. The teeth are jammed into said notches and secured by means of rivets, as shown in FIG. 2. The sides of these notches and the corresponding edges of said inserted teeth are machined into a V-shape, which serves to keep a tooth well in the plane of a blade. The teeth are toleranced to be slightly wider than the corresponding notches, so the teeth are tightly seated in position.

The tight seating of teeth on the periphery of a blade exerts a strong tangential compression stress on the outer rim of a blade. That is detrimental to the operation of a blade since it is just the opposite that is aimed at by the blade tensioning accomplished by hammering. The tangential tensile stress of said outer rim serves in keeping the cutting tooth wheel rim in the plane defined by the sawing gap. Tightness of a tooth mounting may in fact lead to lateral flapping of a tooth wheel rim which can only be fixed by loosening the central portions of a blade by means of hammering.

Elasticity of this tooth fitting is poor. Therefore, the fit tightness of said teeth is impossible to make uniform. For smooth operation of a blade, a reasonable tangential stress would perhaps be circa 1 kN. A common wear of as little as 0.00006 in. in the fitting surfaces of a bit would be enough to completely ruin the tightness. Thus, there will be a situation in the blade that some of the teeth are fixedly in position and some of them are loose. However, a rivet fitted in the side of a tooth anchors said tooth in position and prevents its detachment.

BRIEF DESCRIPTION OF THE DRAWINGS

FIG. 2 is an enlarged, side elevation view of a tooth on the saw blade of FIG. 1;

FIG. 3 is the same view of FIG. 2 but with the tooth subject to a force F;

FIG. 4 is the same view as FIG. 2 and FIG. 3 after the force F disappears and a centrifugal force takes effect;

FIG. 7 is a cross-sectional view taken along line 7—7 of FIG. 2.

FIG. 2 shows a tooth 1 fitted on a blade body 2. The cutting point 3 of said tooth is made of hard metal and it is wider than the thickness of a tooth body and that of a blade body. Thus, the sawing track will be so wide that the blade and its teeth have enough room for free rotation therein. A tooth and a blade body are anchored to each other by means of a rivet 4. As such, the construction complies with U.S. Pat. No. 4,084,470 and Canadian Pat. No. 1 051 321.

During the sawing operation, the point of a tooth is subjected to a shearing force F of the order of circa 0.5-1 kN. If the tooth fitting is loose, the tooth pivots around rivet 4 and bears upon the blade body 2 at a and b, FIG. 3. As the tooth emerges out of the wood, force F disappears and centrifugal force pivots the tooth around rivet 4 in a manner that it now bears upon the blade body at points c and d, FIG. 4. Since the centrifugal force is only in the order of circa 150 N and its effective distance to said rivet serving as a pivot link is a lot smaller, the bearing forces at points c and d will remain minor.

The contact at points a and b occurs like an impact. Then the contact surfaces yield elastically and, at the sudden termination of a shearing force, the elasticity causes the points of contact to bounce off of each other and, even for this reason alone, a tooth ends up in the position shown in FIG. 4. The contact at points a and b is repeated with major force in each cycle. Thus, the surfaces do not hit each other excatly the same way, resulting in surface wear and frictional corrosion. The teeth loosen even further and, as the rivet wear progresses, they come off completely. The mounting can be strengthened by tightening said rivet. If the lateral faces of a notch have already worn away, as depicted in FIG. 4, tightening of a rivet is just a temporary help. Even the blade body must be finally replaced as a result of the lateral surface wear of a notch.

The idea in this invention is to apply a continuous high compression at said tooth bearing points a and b, the elasticity of surfaces at the termination of a tooth force being incapable of disengaging the contact. Thus, the wear of said bearing points is almost completely eliminated.

Figure 1:
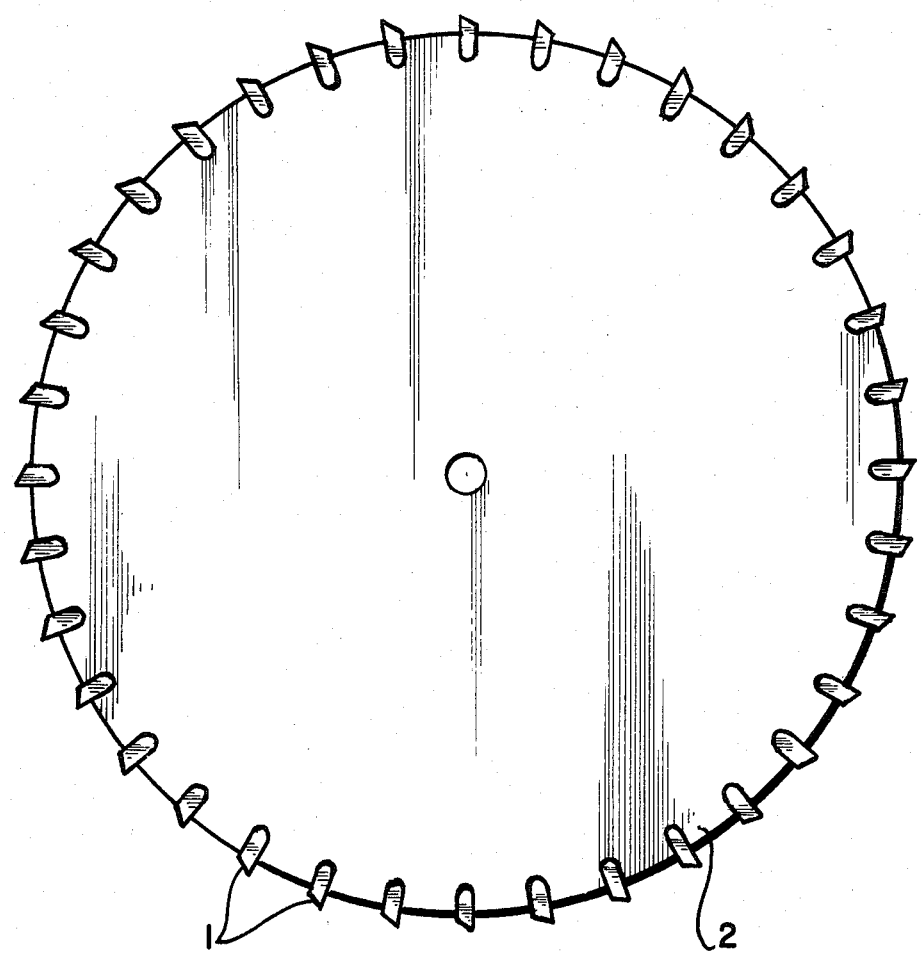
FIG. 1 is a plan view of a prior art saw blade.
Figure 5:
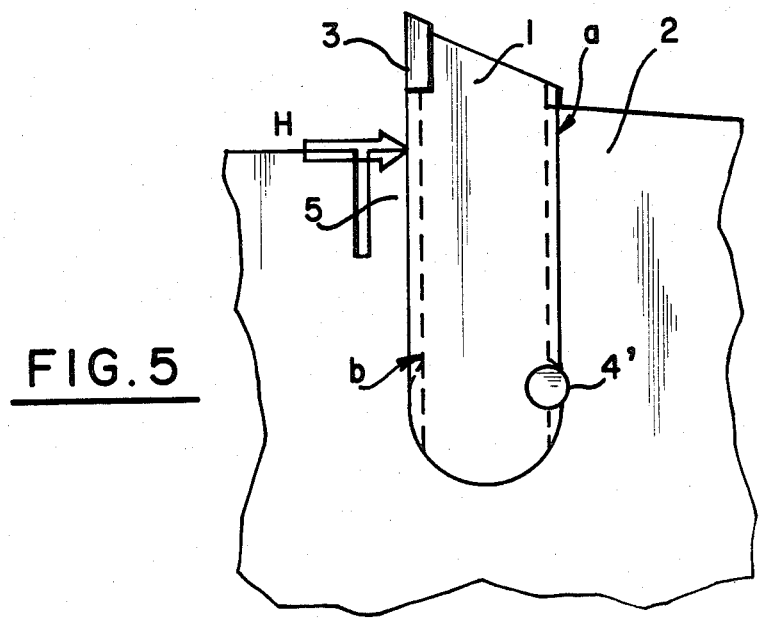
FIG. 5 is an enlarged, side view of a tooth of the present invention under force H.

The edge of a blade in front of a tooth notch is provided with a notch for separating an elastically bending strip 5 at the side of a tooth notch, FIG. 5. The strip is bent by means of a wedge jammed in the notch, so that said strip acquires a continuous plastic deflection towards the tooth notch. Now, when a tooth is jammed in position, the spring force of said strip urges it to bearing point a with a force H which is in the order of circa 3 kN. This exceeds considerably the bearing force provided by said shearing force at point a, and the contact won't be lost at the termination of said shearing force. Elasticity of the strip is of such magnitude that even considerable wear of the contact surfaces does not deprive the tightness of a tooth. Neither does the hammer tensioning of a blade lead to such lack of tightness. Furthermore, the original tightness can always be re-established by effecting a new plastic deflection of said strip.

Figure 6:
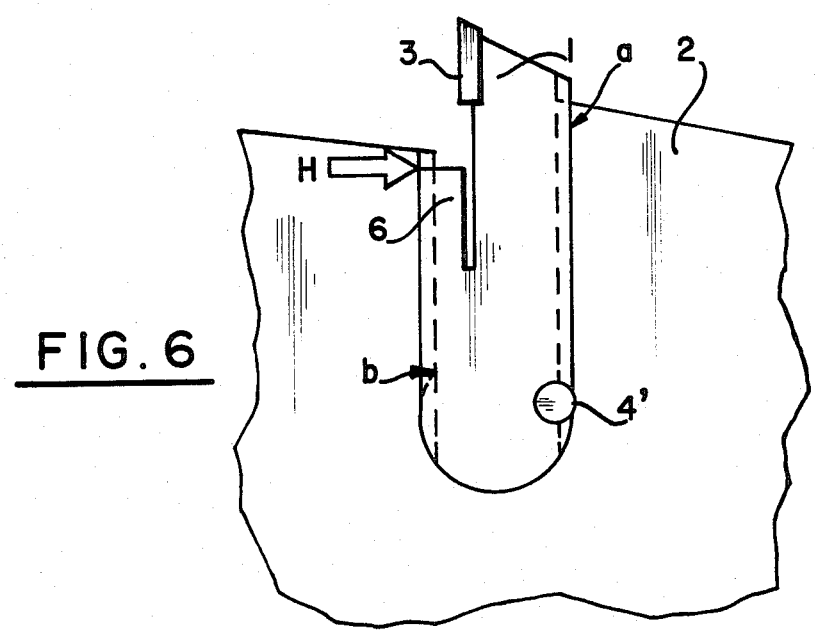
FIG. 6 is the same view as FIG. 5 but with a modification of the elastic strip.

An elastic strip 6 can also be designed on a tooth, the action provided thereby being exactly the same, FIG. 6. In this case, a tooth must be made of such a tough material that sufficient elasticity is achieved.

A rivet for anchoring the tooth in position is located on the rear surface so close to the bottom of a tooth notch that the pressure exerted thereby squeezes the tooth into intimate contact at point b, FIGS. 5 and 6. Thus, the entire tooth is forcefully stressed against just those bearing points a and b to which the bearing reactions of a shearing force are also applied. Also, the bearing reactions of a centrifugal force find their way now to the same points by virtue of the new position of a rivet.

I claim:

1. In the mounting of a saw tooth on a circular saw blade which has a blade axis and body with a blade body edge,
    a saw tooth notch formed on the edge of the blade body of said circular saw blade, said notch comprising opposed leading and following edges joined by a curved notch bottom having front and rear corners,
    a saw tooth having a rear surface which is supported to be pressed against the rear corner of the tooth notch which is further away relative to the blade axis,
    an elastic strip pressing the tooth front surface,
    and a locking rivet mounted on said blade body adjacent to the bottom of the tooth notch and pressing the leading tooth edge against the leading edge of the notch, said rivet being positioned behind the tooth and adjacent to the notch bottom.

2. The mounting claimed in claim 1 wherein said elastic strip is provided on said blade body in front of the tooth notch by cutting the notch commencing from the edge of said blade body.

3. The tooth mounting claimed in claim 1 wherein said elastic strip is provided on the tooth at the leading edge thereof.

4. The tooth mounting in claim 3 wherein said elastic strip is separated from said tooth by a slot.

5. The mounting claimed in claim 1 wherein the tooth and blade body both have surfaces, said surfaces being machined and said strip thereafter being provided plastic deflection.

6. The mounting set forth in claim 1 wherein said rivet is a locking rivet fitted at the point of contact between the tooth and the blade body and being positioned behind said tooth in alignment with a point of contact on the leading side of and closest to the blade center.

* * * * *